US012754941B2

(12) United States Patent
Wang et al.

(10) Patent No.: US 12,754,941 B2
(45) Date of Patent: Oct. 6, 2026

(54) QUERY ANSWERING METHOD BASED ON LARGE MODEL, ELECTRONIC DEVICE, STORAGE MEDIUM, AND INTELLIGENT AGENT

(71) Applicant: Beijing Baidu Netcom Science Technology Co., Ltd., Beijing (CN)

(72) Inventors: Haifeng Wang, Beijing (CN); Hua Wu, Beijing (CN); Hao Tian, Beijing (CN); Jing Liu, Beijing (CN); Ruiqing Zhang, Beijing (CN); Yan Chen, Beijing (CN); Yu Ran, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/969,597

(22) Filed: Dec. 5, 2024

(65) Prior Publication Data

US 2025/0094460 A1 Mar. 20, 2025

(30) Foreign Application Priority Data

Aug. 16, 2024 (CN) ........................ 202411132084.4

(51) Int. Cl.
*G06F 16/3329* (2025.01)
*G06F 16/3332* (2025.01)
*G06F 16/334* (2025.01)

(52) U.S. Cl.
CPC ...... *G06F 16/3329* (2019.01); *G06F 16/3332* (2019.01); *G06F 16/334* (2019.01)

(58) Field of Classification Search
None
See application file for complete search history.

(56) References Cited

U.S. PATENT DOCUMENTS 12,586,575 B1 * 3/2026 Kachuee ............. G06F 16/3329
2015/0074565 A1 * 3/2015 Roche .................. G06F 16/951
(Continued)

FOREIGN PATENT DOCUMENTS

CN 117349275 A 1/2024
CN 117370519 A 1/2024
(Continued)

OTHER PUBLICATIONS

The State Intellectual Property Office of People's Republic of China; Chinese First Office Action; Chinese Application No. 202411132084.4; 19 pages; dated May 7, 2025.

*Primary Examiner* — Son T Hoang
(74) *Attorney, Agent, or Firm* — Faegre Drinker Biddle & Reath LLP

(57) ABSTRACT

A method relates to a field of artificial intelligence technology, and in particular to fields of large model, intelligent search and information processing technology. The method includes: inputting, in response to a retrieval content set retrieved based on a query, the query, the retrieval content set and prompt information for answer generation into the large model, so that the large model performs operations of: processing, based on a current task in the prompt information and the query, a current text corresponding to the retrieval content set to obtain a processed text, where the current task is determined based on a task execution order in the prompt information; and obtaining, in a case of determining that the processed text meets a preset condition, an answer to the query based on the processed text.

16 Claims, 6 Drawing Sheets

(56) References Cited

U.S. PATENT DOCUMENTS

| | | | | |
|---|---|---|---|---|
| 2024/0202189 | A1 | 6/2024 | Wan et al. | |
| 2025/0131247 | A1* | 4/2025 | Mondlock | G06F 16/2471 |
| 2025/0335928 | A1* | 10/2025 | Gunjal | G06F 16/24 |
| 2025/0342218 | A1* | 11/2025 | Zhou | G06F 16/338 |
| 2025/0371016 | A1* | 12/2025 | Vetzler | G06F 16/24578 |
| 2025/0373487 | A1* | 12/2025 | Ehrlich | G06F 16/35 |
| 2025/0378283 | A1* | 12/2025 | Krishnamani | G06F 16/243 |

FOREIGN PATENT DOCUMENTS

| | | | |
|---|---|---|---|
| CN | 117725203 | A | 3/2024 |
| CN | 117972411 | A | 5/2024 |
| CN | 118013106 | A | 5/2024 |
| CN | 118035415 | A | 5/2024 |
| CN | 118260404 | A | 6/2024 |
| CN | 118332086 | A | 7/2024 |

* cited by examiner

QUERY ANSWERING METHOD BASED ON LARGE MODEL, ELECTRONIC DEVICE, STORAGE MEDIUM, AND INTELLIGENT AGENT

TECHNICAL FIELD

This application claims the benefit of Chinese Patent Application No. 202411132084.4 filed on Aug. 16, 2024, the whole disclosure of which is incorporated herein by reference.

TECHNICAL FIELD

The present disclosure relates to a field of artificial intelligence technology, in particular to fields of large model technology, intelligent search technology and information processing technology, and more specifically, to a query answering method based on a large model, an electronic device, a storage medium, and an intelligent agent.

BACKGROUND

With a rapid development of computer and information technology, applications combined with artificial intelligence have made great progress. For example, natural language processing technology based on a large model may understand user queries and provide corresponding answers. However, how to further improve the accuracy of answers generated by the large model is still a problem.

SUMMARY

The present disclosure provides a query answering method based on a large model, an electronic device, a storage medium, and an intelligent agent.

According to an aspect of the present disclosure, there is provided a query answering method based on a large model, including: inputting, in response to a retrieval content set retrieved based on a query, the query, the retrieval content set and prompt information for answer generation into the large model, so that the large model performs operations of: processing, based on a current task to be executed in the prompt information for answer generation and the query, a current text corresponding to the retrieval content set to obtain a processed text, where the current task to be executed is determined based on a task execution order in the prompt information for answer generation; and obtaining, in a case of determining that the processed text meets a preset condition, an answer to the query based on the processed text.

According to another aspect of the present disclosure, there is provided an electronic device, including: at least one processor; and a memory communicatively coupled with the at least one processor; where the memory stores instructions executable by the at least one processor, and the instructions, when executed by the at least one processor, cause the at least one processor to implement the method described above.

According to another aspect of the present disclosure, there is provided a non-transitory computer readable storage medium storing computer instructions, where the computer instructions are configured to cause the computer to implement the method described above.

According to another aspect of the present disclosure, there is provided an intelligent agent configured to implement the method described above.

It should be understood that the content described in this part is not intended to identify the key or important features of embodiments of the present disclosure, nor is it intended to limit the scope of the present disclosure. Other features of the present disclosure will be easily understood through the following specification.

BRIEF DESCRIPTION OF THE DRAWINGS

The accompanying drawings are used to better understand this scheme and do not constitute a limitation to the present disclosure, in which.

DETAILED DESCRIPTION OF EMBODIMENTS

Exemplary embodiments of the present disclosure will be described below with reference to the accompanying drawings, including various details of the embodiments of the present disclosure to facilitate understanding, and they should be considered merely exemplary. Therefore, those skilled in the art should recognize that various changes and modifications can be made to the embodiments described herein without departing from the scope and spirit of this disclosure. Similarly, for clarity and conciseness, descriptions of well-known functions and structures have been omitted in the following description.

The Retrieval-Augmented Generation system is a relatively mature set of technical solutions in current applications. It is widely applied in scenarios such as search engine optimization, virtual assistants, intelligent customer service, and knowledge query answering. It helps large models solve problems related to knowledge acquisition and updating by utilizing information in external knowledge bases.

However, existing Retrieval-Augmented Generation system functionally connect a plurality of sub-modules, each of which requires its own internal data construction, training optimization and parameter adaptation. Output of each step requires manual setting of rules and thresholds. This method lacks entire system consideration between various sub-modules. Furthermore, small models involved in each sub-module have limited capabilities. They may achieve good results when performing a single task, but when performing a plurality of related tasks, there may be problems with unexpected execution results.

According to a query answering method based on a large model provided in the present disclosure, including: inputting, in response to a retrieval content set retrieved based on a query, the query, the retrieval content set and prompt information for answer generation into a large model, so that the large model performs operations of: processing a current text corresponding to the retrieval content set based on a current task to be executed in the prompt information for answer generation and the query to obtain a processed text, where the current task to be executed is determined based on a task execution order in the prompt information for answer generation; and obtaining an answer to the query based on the processed text in a case of determining that the processed text meets a preset condition. By inputting the prompt information for answer generation, the query, and the retrieval content set together into the large model, it is possible to utilize the high processing power of the large model to uniformly execute the plurality of tasks to be executed integrated in the prompt information for answer generation, so as to process the current text, thereby achieving end-to-end unified processing, improving the accuracy of answer generation, and reducing the problem of hallucination occurring in the large model.

Figure 1:
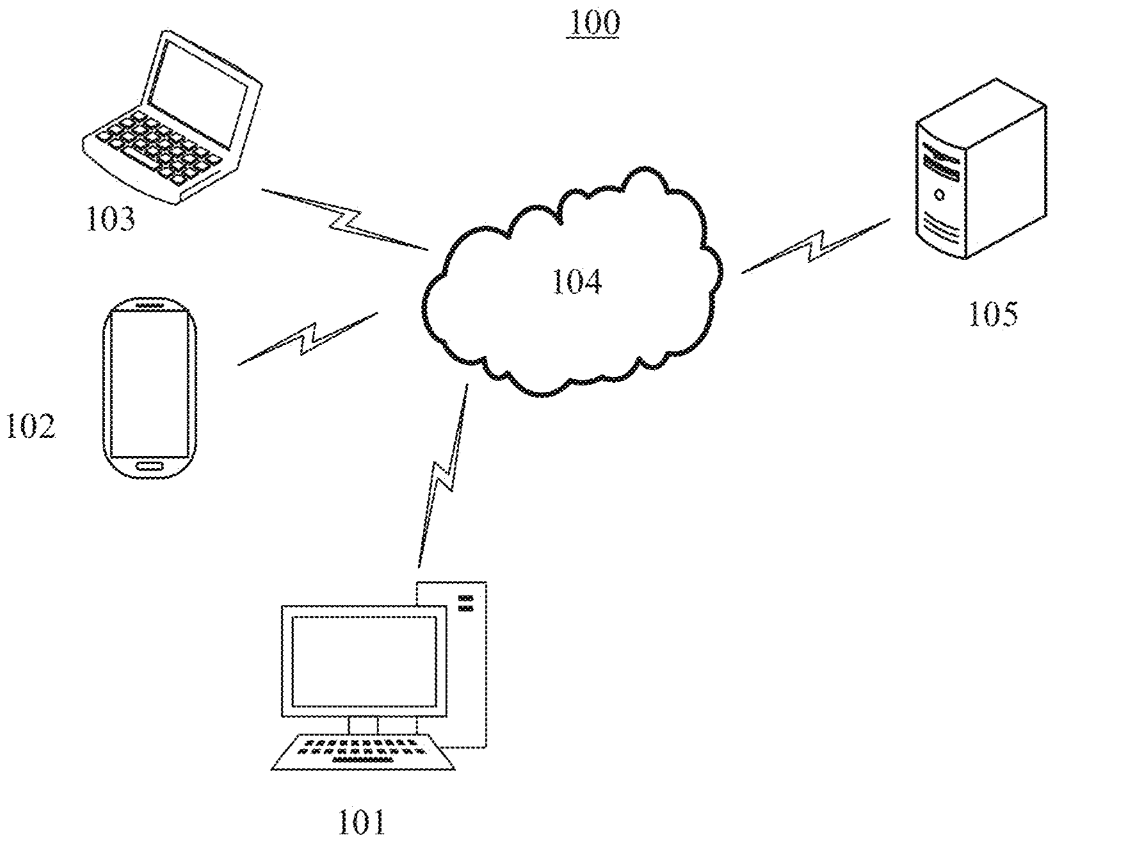
FIG. 1 schematically shows an exemplary system architecture in which a query answering method and apparatus based on a large model may be applied according to an embodiment of the present disclosure.

FIG. 1 schematically shows an exemplary system architecture in which a query answering method and apparatus based on a large model may be applied according to an embodiment of the present disclosure.

It should be noted that FIG. 1 shows only an example of the system architecture in which embodiments of the present disclosure may be applied, so as to help those skilled in the art understand the technical content of the present disclosure, but it does not mean that embodiments of the present disclosure may not be used for other devices, systems, environments or scenarios. For example, in another embodiment, an exemplary system architecture in which a query answering method and apparatus based on a large model may be applied may include a terminal device. Nevertheless, the terminal device may implement the query answering method and apparatus based on a large model provided in the embodiments of the present disclosure without requirements for interacting with a server.

As shown in FIG. 1, the system architecture 100 according to this embodiment may include terminal devices 101, 102, 103, a network 104, and a server 105. The network 104 is used as a medium for providing communication links between the terminal devices 101, 102, 103 and the server 105. The network 104 may include various connection types, such as a wired and/or wireless communication link, and the like.

Users may interact with the server 105 through the network 104 using terminal devices 101, 102, and 103 to receive or send messages, etc. Various communication client applications may be installed on the terminal devices 101, 102 and 103, such as knowledge reading applications, web browser applications, search applications, instant messaging tools, email clients, and/or social platform software, etc. (for example only).

The terminal devices 101, 102, and 103 may be various electronic devices with display screens and supporting web browsing, including but not limited to smartphones, tablet computers, laptop computers, desktop computers, and the like.

The server 105 may be a server that provides various services, such as a background management server (for example only) that provides support for contents browsed by users using the terminal devices 101, 102 and 103. The background management server may analyze and process received data containing queries, such as user requests, and provide a feedback on the processing results (such as web pages, information, answers or data acquired or generated according to user requests) to the terminal devices.

Optionally, the server 105 may run one or more services or software applications that enable to execute an intelligent agent. Users may interact with the intelligent agent using the terminal devices 101, 102, 103.

It should be noted that the query answering method provided in the embodiments of the present disclosure may generally be implemented by the terminal devices 101, 102 or 103. Accordingly, the query answering apparatus provided in the embodiments of the present disclosure may also be provided in the terminal devices 101, 102 or 103.

Alternatively, the query answering method provided in the embodiments of the present disclosure may generally be implemented by the server 105. Accordingly, the query answering apparatus provided in the embodiments of the present disclosure may generally be provided in the server 105. The query answering method provided in the embodiments may also be implemented by a server or server cluster that is different from the server 105 and may communicate with the terminal devices 101, 102, 103 and/or the server 105. Accordingly, the query answering device provided in the embodiments of the present disclosure may also be provided in a server or server cluster that is different from the server 105 and may communicate with the terminal devices 101, 102, 103 and/or the server 105.

For example, when a user inputs a query through a text box, the terminal devices 101, 102 and 103 may acquire the input query and then send the acquired query to the server 105. The server 105 is used to analyze the query to determine a retrieval content set, and input the retrieval content set, the query and prompt information for answer generation into a large model to obtain an answer to the query. Alternatively, a server or server cluster that may communicate with the terminal devices 101, 102, 103 and/or the server 105 analyzes the query and ultimately obtains the answer to the query. The answer to the query may be transmitted to the terminal devices 101, 102 and 103 for display to the user, thus completing query answering interaction.

It should be understood that the number of terminal devices, networks, and servers shown in FIG. 1 is only illustrative. Any number of clients, networks and servers may be provided as desired in practice.

In the technical solution of the present disclosure, collecting, storing, using, processing, transmitting, providing, disclosing, and applying etc. of the personal information of the user involved in the present disclosure all comply with the relevant laws and regulations, are protected by essential security measures, and do not violate the public order and morals.

In the technical solution of the present disclosure, the user's authorization or consent is acquired before the user's personal information is acquired or collected.

Figure 2:
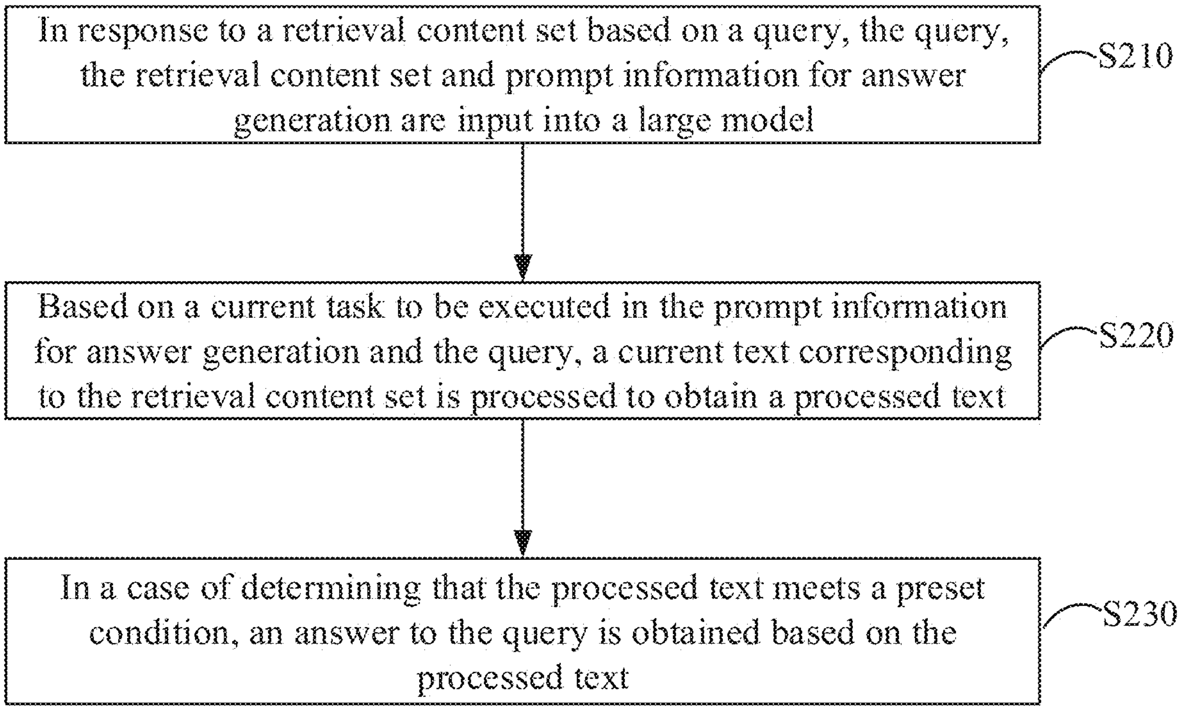
FIG. 2 schematically shows a flowchart of a query answering method based on a large model according to an embodiment of the present disclosure.

FIG. 2 is a flowchart of a query answering method based on a large model according to an embodiment of the present disclosure.

As shown in FIG. 2, the query answering method may include operation S210 to operation S230.

In operation S210, in response to a retrieval content set retrieved based on a query, the query, the retrieval content set and prompt information for answer generation are input into a large model.

In operation S220, based on a current task to be executed in the prompt information for answer generation and the query, a current text corresponding to the retrieval content set is processed to obtain a processed text.

In operation S230, in a case of determining that the processed text meets a preset condition, an answer to the query is obtained based on the processed text.

According to the embodiments of the present disclosure, the query answering method based on a large model may be implemented by a server, but it is not limited to this. It may also be implemented by a terminal device or an intelligent agent.

According to the embodiments of the present disclosure, the retrieval content set may be a collection of relevant information retrieved from a plurality of data sources based on the query, such as the Internet, databases, text collections, social media, etc. It may include videos, articles, web pages, paragraphs, sentences, or other forms of data, without limitation, as long as it is related to the proposed query.

According to the embodiments of the present disclosure, the prompt information for answer generation may be used to indicate how the large model generates an answer based on the provided query and the retrieval content set. The answer prompt information may help the large model understand the requirements for tasks needed to be executed, and guide the large model to perform specific operations to generate the answer.

The elements contained in the prompt information for answer generation include but are not limited to task role, task description, task rules, answer generation rules, and output format.

According to some embodiments of the present disclosure, in response to a query provided by a user, a retrieval may be performed on a plurality of data sources to obtain a retrieval content set. The large model is used to execute the tasks to be executed in the answer prompt information, a plurality of processes are performed on a current text corresponding to the retrieval content set according to the tasks to be executed, to obtain the processed text that meets the preset condition. It may be understood that if the query is text content, it may be directly input into the large model. If it is voice content or video content, the voice content or the video content may be converted into corresponding text content before subsequent processing.

The current text corresponding to the retrieval content set may include the retrieval content set, but it is not limited thereto. It may also include content obtained after the retrieval content set is processed, for example, content obtained after performing a previous task process on the retrieval content set by using the large model.

According to the embodiments of the present disclosure, the current task to be executed is determined based on a task execution order in the prompt information for answer generation.

According to the embodiments of the present disclosure, the task to be executed may be a task that performs a specific operation on the current text to generate or extract text information in a specific form.

According to the embodiments of the present disclosure, the prompt information for answer generation may include a plurality of tasks to be executed. The task execution order in the prompt information for answer generation determines an order in which these tasks should be executed, so as to ensure the logic and effectiveness of the entire processing process. When all the tasks to be executed are executed, the processed text may be obtained.

According to the embodiments of the present disclosure, one or more preset conditions may be set. The preset condition may be preset based on the requirements for the answers, or a plurality of preset conditions corresponding to the plurality of tasks to be executed may be set according to the tasks to be executed.

According to the embodiments of the present disclosure, in a case of determining that the processed text meets a preset condition, the processed text may be used as an answer to the query. However, it is not limited to this. The answer may also be directly extracted from the processed text or obtained through certain logical reasoning, or the answer may be obtained by performing format organization on the processed text.

According to the embodiments of the present disclosure, by inputting the prompt information for answer generation, the query, and the retrieval content set together into the large model, it is possible to utilize the high processing power of the large model to uniformly execute the plurality of tasks to be executed integrated in the prompt information for answer generation, so as to process the current text, thereby achieving end-to-end unified processing, improving the accuracy of answer generation, and reducing the problem of hallucination when the large model executes the plurality of tasks to be executed.

With reference to FIG. 3 to FIG. 7, the method shown in FIG. 2 will be further explained below in conjunction with specific embodiments.

Figure 3:
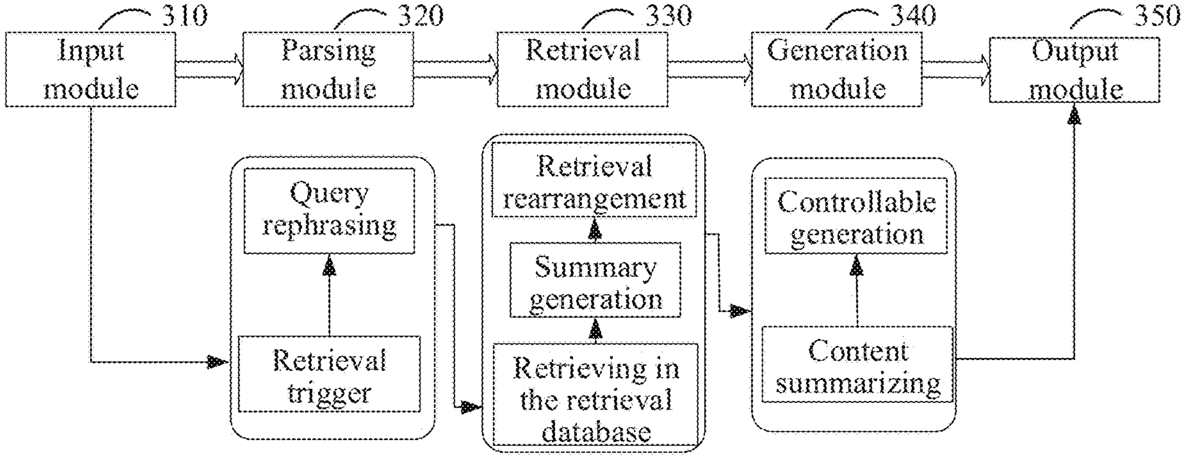
FIG. 3 schematically shows a module diagram of a conventional query answering system according to relevant examples.

FIG. 3 schematically shows a module diagram of a conventional query answering system according to relevant examples.

As shown in FIG. 3, the query answering system includes an input module 310, a parsing module 320, a retrieval module 330, a generation module 340, and an output module 350. The input module 310 is used to receive a query input by the user. The parsing module 320 is used to perform retrieval trigger and rephrase the query. The retrieval module 330 is used to retrieve in the retrieval database, generate a summary, and rearrange the retrieved content. The generation module 340 is used to summarize the retrieved content and generate a result. The output module 350 is used to output an answer. Each module is relatively independent and responsible for different functions. The inputs and outputs of the plurality of modules are connected through pipelines.

In the above method, each module requires to perform its own internal data construction, training optimization and parameter adaptation. The output of each step requires manual setting of rules and thresholds, resulting in poor generalization. The models for summary generation and retrieval rearrangement are both small models, which are weak in content integrity and understanding. This not only lose key information of the retrieved content, but also cause poor retrieval resources to be superior to high quality resources input into the generation model, resulting in less correct information for the generation model to refer to. Although the generation module is a large parameter model, the quality of the final generated response is poor. When new features require to be added (such as time features, authoritative features, etc.), the plurality of sub-modules need to be readjusted, while the thresholds of each sub-module require to be regressed and reset. The mobility is relatively low and it is impossible to achieve rapid transfer.

Figure 4:
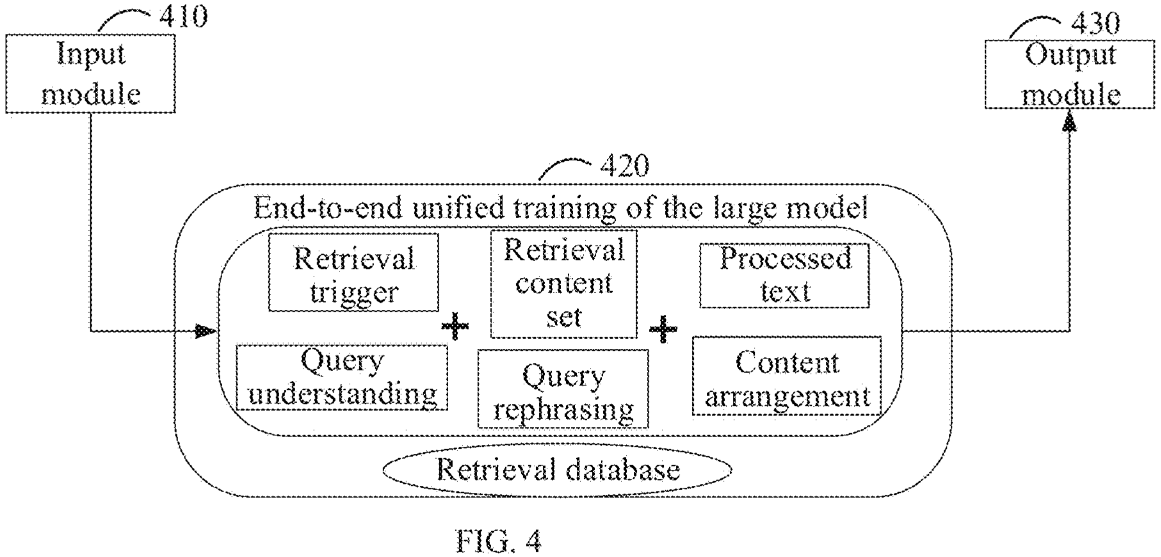
FIG. 4 schematically shows a module diagram of a query answering system based on a large model according to an embodiment of the present disclosure.

FIG. 4 schematically shows a module diagram of a query answering system according to an embodiment of the present disclosure.

As shown in FIG. 4, the query answering system includes an input module 410, a processing module 420 and an output module 430. The input module 410 is used to receive a query input by a user, while the processing module 420 is used to uniformly process the entire process. Specifically, a large model is employed for query understanding and retrieval trigger determination. During retrieval, the large model is used to rephrase the query. A plurality of rephrased queries are used for retrieval, and a retrieval content set is input into the large model at one time. The large model is used to perform content arrangement on the retrieval content set and generate a processed text. The output module 430 is used to output an answer. The end-to-end unified processing of the large model is achieved, so that the entire query answering system has greatly improved.

According to the embodiments of the present disclosure, before executing operation S210 as shown in FIG. 2, the query answering method may further include: acquiring a retrieval content set.

The retrieval content set may be acquired from a plurality of data sources based on a query. However, it is not limited to this. The query may also be rephrased to obtain a plurality of rephrased queries. Based on the plurality of rephrased queries, the retrieval content set may be acquired from the plurality of data sources.

Alternatively, the large model may be utilized to perform content rephrasing on the query.

A detailed explanation on performing query analysis and rephrasing task for the large model is provided below.

According to the embodiments of the present disclosure, in response to a received query, the query and prompt information for query analysis are input into the large model, so that the large model performs operations of: performing retrieval trigger analysis on the query based on a retrieval trigger recognition task in the prompt information for query analysis to obtain a retrieval trigger analysis result. In a case that the retrieval trigger analysis result represents that a retrieval operation needs to be triggered, the query is rephrased based on a query rephrasing task in the prompt information for query analysis to obtain a plurality of rephrased queries, so as to obtain a retrieval content set based on the plurality of rephrased queries.

According to the embodiments of the present disclosure, the query prompt information may be a preset prompt template, which includes a series of rules, prompts, or instructions, etc., so as to form a retrieval trigger recognition task. It may be used to guide the large model to understand and analyze the query, for example, to help the large model to determine whether the user's query has timeliness, whether it is objective knowledge, or whether it exceeds the knowledge boundary of the large model, etc., so as to determine whether the query needs to be retrieved.

For example, the user's query is "What's the weather like today?" This query includes a specific timeliness requirement of "today", and "what's the weather like" also exceeds the knowledge boundary of the large model. It requires obtaining the latest weather information from an external weather information platform. In this case, the large model may only answer after retrieval.

According to some embodiments of the present disclosure, due to the complexity of some user queries, it may be difficult to directly search for the desired knowledge in traditional retrieval systems based on semantic matching. It is needed to perform semantic understanding according to the original query from the user and rephrase the original query, so as to obtain better retrieval results in the retrieval system. The entire principle of query rephrasing is that the system will retain complete information first, without losing any details that may affect the accuracy of the answer. Furthermore, the query will be divided into key parts, and core terms or keywords will be extracted as a basis for understanding the query and retrieving relevant answers.

For queries with timeliness requirements, it is needed to first rephrase the query containing corresponding time information. If the original query contains timeliness requirements, a query containing specific time information is constructed to acquire the latest relevant information. Then a query that does not contain explicit time words is rephrased. If the original query does not contain explicit time words, a query that does not contain time words is constructed to expand the retrieval scope and prevent the omission of potentially relevant answers.

For example, the user's query is about what is the domestic sales volume of product A in the past five months and the past year. This query encompasses two specific time words. After rephrasing this query using the large model, the following queries are obtained: "What was the domestic sales volume of product A in the past five months?", "What was the domestic sales volume of product A in the past five months, July 2024", "What was the domestic sales volume of product A in the past year?", and "What was the domestic sales volume of product A in the past year, 2024" By semantically decomposing the query and expanding the time information, it may more completely capture the user's intention. If the rephrasing is based on a small model, the original query is generally only divided into "What was the domestic sales volume of product A in the past five months?" and "What was the domestic sales volume of product A in the past year?" This method lacks expansion of the time information, which may result in retrieval results that are too broad and unable to accurately capture the user's intention.

According to the embodiments of the present disclosure, by using prompt information for query analysis, the large model may more effectively handle various complex queries. Through retrieval trigger analysis and query rephrasing, the diversity and coverage of retrieved information may be enhanced, and information omissions may be reduced, thereby more accurately positioning and understanding of user requirements, and providing more accurate answers.

According to the embodiments of the present disclosure, in a case that the retrieval trigger analysis result represents that retrieval operation does not need to be triggered, the answer to the query is generated based on the query.

Specifically, if it is determined that the user's query involves objective knowledge and does not exceed the knowledge boundary of the large model itself, it may directly answer through a knowledge base built-in the large model. In this case, external retrieval is not needed, and the large model may also provide accurate, relevant and useful answers.

For example, if the user's query is: "What is the diameter of the Earth?" In this case, no additional retrieval operation is needed, and the query may be directly answered through the knowledge base built into the large model.

According to the embodiments of the present disclosure, by analyzing the query, when it is possible to directly provide an answer using the large model without external retrieval, the speed of answering may be accelerated, providing a faster response speed.

According to the embodiments of the present disclosure, rephrasing the query based on the query rephrasing task in the prompt information for query analysis to obtain the plurality of rephrased queries includes: rephrasing the query based on a rephrasing rule that matches with a query type of the query in the query rephrasing task to obtain the plurality of rephrased queries.

According to the embodiments of the present disclosure, when processing different types of queries, it is needed to adopt targeted and specific processing principles or strategies according to the specific scenarios or types of the queries.

For example, for rephrasing a predictive query, it is needed to clarify a specific object of a prediction, a time scope and a geographical scope of the prediction. The rephrased query should clearly point to the future, focusing on upcoming or possible events, trends or results. For subjective rephrasing, the rephrased query should focus on personal opinions, feelings, or assessments. A specific object of subjective evaluation is clarified, such as products, services, events, etc. For multilingual rephrasing, it is needed to ensure that the rephrased query maintains the original meaning and context of the original query. The cultural background and habits of a target language are considered to ensure that the rephrased query is natural and fluent in the target language.

According to the embodiments of the present disclosure, by explicitly defining a mapping relationship between the rephrasing rule and the query type in the prompt information for query analysis, it may guide the large model to perform query rephrasing tasks. By adopting rephrasing rules that matches with the query type to rephrase the query, it may ensure that the rephrased query accurately reflects the user's intention, thereby improving the accuracy and efficiency of retrieval.

According to the embodiments of the present disclosure, rephrasing the query based on the query rephrasing task in the prompt information for query analysis to obtain the plurality of rephrased queries includes: rephrasing the query based on the query rephrasing task to obtain a plurality of initial rephrased queries. When a correlation between each of the plurality of initial rephrased queries and the query meets a correlation threshold in the query rephrasing task, the plurality of rephrased queries are obtained based on the plurality of initial rephrased queries.

According to the embodiments of the present disclosure, the correlation between the respective initial rephrased query and the query is an important indicator for measuring the quality of rephrasing. It may utilize natural language processing technology to calculate a semantic similarity between the query and the initial rephrased query. By analyzing the keywords of the query and the initial rephrased query, it may determine whether the initial rephrased query retains key information of the query.

According to the embodiments of the present disclosure, by setting a correlation threshold in the prompt information for query analysis, it may determine whether the initial rephrased query meets an expectation for the large model to automatically filter the plurality of initial rephrased queries, so as to ensure that the retrieved query may accurately reflects the core intention and inquiry requirements of the original query, thereby improving the accuracy of retrieval and the stability of executing end-to-end query answering for the large model.

According to the embodiments of the present disclosure, indicators for measuring the quality of rephrasing may also include a rephrasing availability rate and the impact on the quality of end-to-end generated results. The rephrasing availability rate represents an effective proportion that the rephrased queries may be successfully understood by a search engine and used for retrieval. It may reflect the stability and practicality of large model rephrasing. The end-to-end generated results refer to an entire process from query input to final result output. The query rephrasing is understood as part of the entire process, the quality of rephrasing may directly affect the accuracy and correlation of the final results. Therefore, these two indicators may be used to evaluate the quality of rephrasing.

Figure 5:
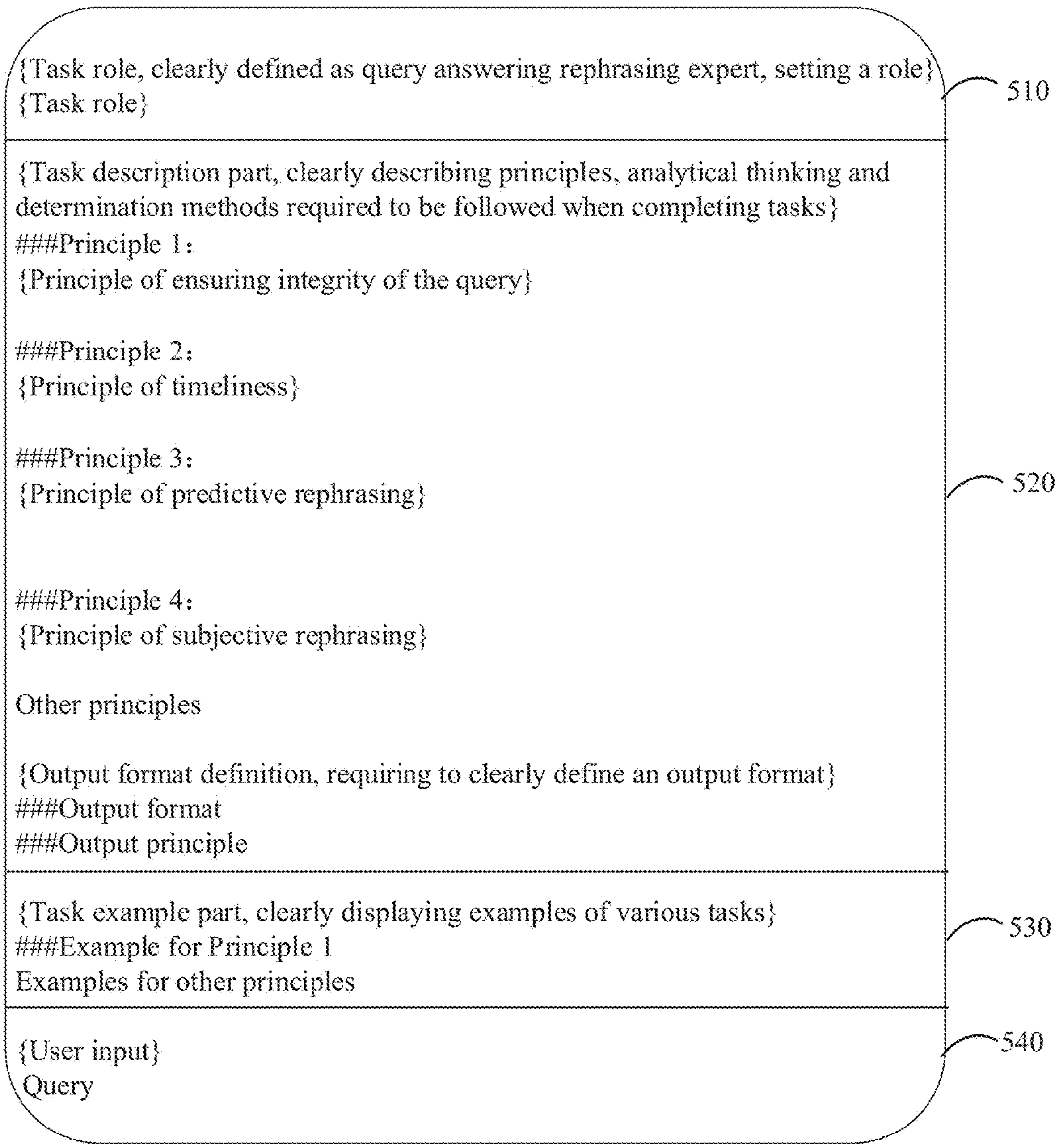
FIG. 5 schematically shows a schematic diagram of a template of prompt information for query analysis according to an embodiment of the present disclosure.

FIG. 5 schematically shows a schematic diagram of a template of prompt information for query analysis according to an embodiment of the present disclosure.

As shown in FIG. 5, the prompt information for query analysis from top to bottom includes a task role 510, a query rephrasing task 520, a query rephrasing example 530 and a preset position for query 540. The task role 510 is used to define a role played by the explicit large model. The query rephrasing task 520 contains a plurality of rephrasing principles, also known as rephrasing rules, including a principle for ensuring query integrity, a timeliness principle, a rephrasing principle for predictive query, a rephrasing principle for subjective query, and an output principle, etc. It should be understood that the principles may be deleted, or other principles may be added as desired, and the present disclosure is not limited to this. The query rephrasing example 530 may be used to clearly display various task examples. The preset position for query 540 is set at the bottom, and the query input by a user may be filled into the preset position for query 540, so as to form complete information as input data for the large model.

The rephrasing rule in the query rephrasing task may be used to clarify an execution standard for the large model, thereby improving an execution standardization of the large model. Additionally, the query rephrasing example or the correlation threshold are used as evaluation information for the large model during executing the query rephrasing task, serving as another execution standard, so as to allow the large model to determine whether the output rephrasing query meets an expected effect. Based on this, an execution guideline may be provided for the large model from a plurality of aspects by the rephrasing rule in the query rephrasing task contained in the prompt information for query analysis and the evaluation information used to evaluate whether the rephrasing query meets the requirements, thereby ensuring end-to-end processing for the large model while reducing the problem of hallucination.

According to the embodiments of the present disclosure, inputting the query and the prompt information for query analysis into the large model includes: filling the query into a preset position in the prompt information for query analysis and inputting the prompt information for query analysis into the large model. The retrieval trigger recognition task and the query rephrasing task in the prompt information for query analysis are respectively added with an order identifier used to indicate an order in which tasks are executed.

According to the embodiments of the present disclosure, the plurality of tasks may be arranged in a structured manner in the prompt information for query analysis, and the order identifiers may be added to indicate the execution order of these tasks, thereby helping the large model to execute the tasks in a correct order.

According to the embodiments of the present disclosure, a position used to fill the user input query may be preset in the prompt information for query analysis, so as to combine the query and the prompt information for query analysis to form a complete input.

According to the embodiments of the present disclosure, by filling the query into the preset position in the prompt information for query analysis to form a complete input, the understanding of the large model is facilitated. By setting the respective order identifiers for the retrieval trigger recognition task and the query rephrasing task, the large model may perform the corresponding retrieval trigger recognition and query rephrasing operations according to the determined tasks and order, thereby improving the execution efficiency and controllability of the large model in retrieval trigger recognition and query rephrasing operations.

The previous text provides a detailed introduction to the tasks executed by the large model, such as retrieval trigger recognition and query rephrasing. The following text will explain an answer generation task executed by the large model.

According to the embodiments of the present disclosure, inputting the query, the retrieval content set, and the prompt information for answer generation into the large model includes: filling the query and the retrieval content set into preset positions in the prompt information for answer generation, respectively, and inputting the prompt information for answer generation into the large model. The prompt information includes a plurality of tasks added with order identifiers used to indicate an order in which the tasks are executed.

According to the embodiments of the present disclosure, in the prompt information for answer generation, the plurality of tasks are arranged in a structured manner, and order identifiers are added to indicate the execution order of these tasks, thereby helping the large model to execute tasks in the correct order. In the prompt information for answer generation, the positions of the query and the retrieval content set may be preset respectively, so as to combine the query, the retrieval content set, and the tasks to be executed into a complete input.

According to the embodiments of the present disclosure, by filling the query and the retrieval content set into the preset positions in the prompt information for answer generation to form a complete input, and setting the order identifiers for the tasks to be executed, it is possible to enable the large model to perform corresponding text processing tasks according to the determined tasks and order, thereby improving the execution efficiency and controllability of the large model during answer generation.

According to the embodiments of the present disclosure, the current task to be executed may include a content arrangement task. Based on the current task to be executed for answer generation in the prompt information for answer generation, the current text corresponding to the retrieval content set is processed to obtain the processed text, including: performing content processing on the current text based on the content arrangement task to obtain a content-augmented processed text.

According to the embodiments of the present disclosure, the content arrangement task may involve a series of optimization processes on the current text, including but not limited to optimizing the content, order, and semantics of the current text, thereby obtaining the content-augmented processed text. The content-augmented processed text exhibits improvements in terms of content quality, information quantity, or readability.

According to the embodiments of the present disclosure, the current text is processed through the content arrangement task, which may cause the processed text more focused on core information, reduce redundant or irrelevant content, and improve readability.

According to the embodiments of the present disclosure, the content arrangement task includes a content filtering task. Based on the content arrangement task, content processing is performed on the current text corresponding to the retrieval content set to obtain the content-augmented processed text, including: determining a predetermined number of target sub-texts from the current text based on a content matching degree of each sub-text in the current text and an attribute matching degree of each sub-text in the current text, as the content-augmented processed text. The content matching degree may be determined based on a similarity between the sub-text and the query. The attribute matching degree may be determined based on traceability information of the sub-text. The traceability information of the sub-text is determined based on the retrieval content set. The predetermined number is determined based on the content filtering task.

According to the embodiments of the present disclosure, the plurality of sub-texts may be generated from results retrieved from different data sources. The plurality of sub-texts may also be generated from different results retrieved from the same data source. Each sub-text may correspond to a retrieval result. For example, the plurality of sub-texts may be in one-to-one correspondence with the plurality of retrieval contents in the retrieval content set.

According to the embodiments of the present disclosure, the content matching degree may implicitly perform similarity correlation on the query with the plurality of sub-texts through the internal vectors of the large model. Thus, the sub-texts may be ranked according to the results of the content matching degree, and a plurality of top-ranked sub-texts may be selected as the predetermined number of target sub-texts. The similarity calculation method used by the large model is not limited herein, as long as it is used to determine the content matching degree between the query and the sub-texts.

According to the embodiments of the present disclosure, the traceability information of the sub-text represents information related to the source of the sub-text. This includes, but is not limited to, the publishing site, publisher, publishing time, authority of the publishing site or publisher, and relevance of the sub-text content. According to the traceability information, sub-texts with suspicious sources may be removed. The sub-texts that do not meet a time constraint required by the current query may also be removed. This ensures that the filtered sub-texts are more authoritative and authentic.

For example, the current query is “climate change trends in a certain region in recent years”. A sub-text contained in the retrieval content set is derived from an unverified personal blog, which often publishes unverified information, so its source is suspicious. When performing the content filtering task, this sub-text may be removed to avoid introducing inaccurate or misleading information. Although another sub-text contained in the retrieval content set comes from a reliable news agency, its publishing time is 10 years ago, and it clearly does not meet the time limit requirement of “in recent years”. Therefore, when performing the content filtering task, this sub-text may be removed to ensure compliance with the time limit requirement of the current query.

The traceability information of the sub-texts may be scored according to one or more preset rules, such as credibility rule, timeliness rule, and authority rule, to obtain the attribute matching degree. However, it is not limited to this. Attribute matching recognition may also be performed on the traceability information of the sub-texts using the large model to obtain the attribute matching degree.

The attribute matching degree and the content matching degree may be weighted and summed to obtain a target matching degree. Based on the target matching degree, a predetermined number of target sub-texts may be determined from the plurality of sub-texts.

According to the embodiments of the present disclosure, the content filtering task in the content arrangement task is executed on the current text based on the content matching degree and attribute matching degree of the plurality of sub-texts. This ensures that the obtained processed text has strong correlation with the problem while being more authentic and authoritative.

According to the embodiments of the present disclosure, the content arrangement task includes a content extraction task. Based on the content arrangement task, content processing is performed on the current text to obtain the content-augmented processed text, including: performing noise reduction on the current text based on the content extraction task to obtain a noise reduced text, and performing content extraction on the noise reduced text to obtain a plurality of hierarchically augmented text segments as the content-augmented processed text.

According to the embodiments of the present disclosure, performing noise reduction on the current text may include cleaning the current text, removing unnecessary content such as spaces, line breaks, comments, URLs and tags. Duplicate text lines or paragraphs are recognized and deleted to avoid repeatedly processing the same information. Stop words, duplicate words and irrelevant words are removed, and ambiguous words are eliminated or replaced. Grammatical errors and spelling mistakes are fixed. The format of the text data is updated, so that the text conforms to specific format requirements. Noise reduction is performed on the current text, which helps improve the quality and readability of the content-augmented processed text.

According to the embodiments of the present disclosure, content extraction is performed on the noise reduced text, including extracting entities, keywords, events and relationships, etc. from the text content.

Specifically, the large model may be pre-trained by training data in the database, so that the large model may recognize entity information such as names of people, places, institutions, time, and dates from the current text. It may also recognize events in the current text, such as meetings, transactions, natural disasters, etc., and extract key information such as type, time, location, and participants of the events. Furthermore, it may recognize relationships between entities in the text, such as "A is a subsidiary of B", "C has reached a cooperation with D", etc., and extract the types of relationships and participating entities. The extracted key information, such as entities, keywords, events and relationships, is arranged and output in a certain structure.

According to the embodiments of the present disclosure, the plurality of target sub-texts after undergoing the content filtering task may be regarded as the current text. The plurality of target sub-texts may be combined to obtain the current text. Each target sub-text in the current text serves as one or more text segments of the current text. However, it is not limited to this. It is also possible to directly perform the content extraction task without undergoing the content filtering task. The plurality of retrieval contents in the retrieval content set may be combined to obtain the current text. Each retrieval content serves as one or more text segments in the current text.

According to the embodiments of the present disclosure, the plurality of text segments in the current text may share the same knowledge points or possess knowledge points from different dimensions. Through performing noise reduction on the current text, duplicate and redundant information may be removed while retaining different information related to the query. When extracting the content of the text segment, relevant information related to the query from different dimensions or in fine granularity may be acquired from various text segments, so that the quality of the extracted text content is higher.

According to the embodiments of the present disclosure, by performing noise reduction on the current text, irrelevant information and noise may be effectively removed from the current text, so that the subsequent content extraction is more focused on key information, thereby improving the accuracy and efficiency of content extraction.

According to an embodiment of the present disclosure, content extraction is performed on the noise reduced text to obtain the plurality of hierarchically augmented text segments as the content-augmented processed text, including: rearranging a plurality of text segments based on contextual relationships among the plurality of text segments in the noise reduced text, and generating identification information configured to identify respective contextual relationships of the plurality of text segments, so as to obtain a processed text with paragraph-level hierarchical augmentation, and rearranging a plurality of sentences based on contextual relationships among the plurality of sentences, and generating identification information configured to identify respective contextual relationships of the plurality of sentences, so as to obtain a hierarchically augmented processed text. The plurality of sentences are obtained by splitting the text segments in the processed text with paragraph-level hierarchical augmentation.

According to the embodiments of the present disclosure, after performing noise reduction on the current text and removing the duplicated part, the processed text may still have a plurality of text segments. When the number of the processed text segments exceeds a predetermined threshold, such as when the number of the text segments is greater than 2, the text segments may be rearranged first, and then the sentences in the text segment may be rearranged.

According to the embodiments of the present disclosure, the contextual relationships among the plurality of text segments include logical order, causal relationships, and general-specific relationships between the text segments. According to the logical order, causal relationships, and general-specific relationships between the text segments, identification information such as paragraph numbers may be generated to identify respective contextual relationships of the plurality of text segments. The plurality of text segments may be rearranged according to the paragraph numbers, so that the order of the plurality of text segments may be more in line with logical and reading habits.

According to the embodiments of the present disclosure, the text segments in the processed text with paragraph-level hierarchical augmentation are split into the plurality of sentences for more fine-grained analysis. The contextual relationships among the plurality of sentences include logical order, causal relationships, and transitional relationships between the sentences. According to the logical order, causal relationships, and transitional relationships between the plurality of sentences, identification information such as sentence numbers may be generated to identify respective contextual relationships of the plurality of sentences. The plurality of sentences may be rearranged according to the sentence numbers, so that the order of the plurality of sentences may be more in line with logical and expression habits.

According to another embodiment of the present disclosure, content extraction is performed on the noise reduced text to obtain the plurality of hierarchically augmented text segments as the content-augmented processed text, which further includes: based on the contextual relationships among a plurality of sentences obtained by splitting the noise reduced text, rearranging the plurality of sentences, and generating identification information configured to identify respective contextual relationships of the plurality of sentences, so as to obtain the hierarchically augmented processed text.

According to the embodiments of the present disclosure, after performing noise reduction on the current text, when the number of the processed text segments is less than a predetermined text segment threshold, such as when the number of the text segments is less than or equal to 2, all text segments may be split into a plurality of sentences. The contextual relationships among the plurality of sentences are determined based on the logical order, causal relationships, and transitional relationships between the plurality of sentences, and the sentence numbers are generated to identify the contextual relationships of the plurality of sentences. The plurality of sentences may be rearranged according to the sentence numbers, so that the order of the plurality of sentences may be more in line with logical and expression habits.

According to the embodiments of the present disclosure, the text content is rearranged through the contextual relationships among the text segments and the sentences. On the basis of retaining the original text information, the processed text has a clearer and more organized structure.

According to the embodiments of the present disclosure, based on a summary generation task in the prompt information for answer generation, a summary generation processing is performed on the retrieval content set to obtain a summary set as the current text.

According to the embodiments of the present disclosure, a summary generation technology, such as a summary generation technology based on deep learning, may be utilized to process each retrieval content in the retrieval content set. By analyzing the main content, key information, and structure of each retrieval content, and then removing redundant and secondary information, a refined summary may be generated. After the summary generation processing, each retrieval content will correspond to a summary, such as a text segment. These summaries are combined to form a summary set. The summary set is a generalization of the original retrieval content set, containing the most relevant information to the query.

For example, the set of summaries may be combined as the current text. The plurality of sub-texts in the current text correspond to the plurality of summaries in the summary set. The content filtering task and content execution task are performed sequentially on the current text.

According to the embodiments of the present disclosure, by performing summary generation processing on the retrieval content set, a highly summarized summary set is obtained as the current text, so that the entire information amount of the current text is greatly simplified, thereby improving the efficiency of subsequent information processing.

According to the embodiments of the present disclosure, the current task to be executed includes a structural arrangement task. Based on the current task to be executed, the current text corresponding to the retrieval content set is processed to obtain the processed text, including: performing structuring processing on the current text based on the structural arrangement task to obtain a structurally augmented processed text.

According to the embodiments of the present disclosure, the structural arrangement task is to transform unstructured text content into text content with a clear structure and organized information format.

According to the embodiments of the present disclosure, structuring processing is performed on the current text, including: determining a basic structural framework of the current text according to the text content. Based on the basic structural framework of the current text, a structural element to be used is determined, such as a title, a subtitle, a list, etc. The content of the current text is redistributed into the structural framework. The title and subtitle may be used to arrange information, ensuring that the arranged information is clear and understandable. The list may be used to arrange similar or related information points.

According to the embodiments of the present disclosure, structuring processing is performed on the current text, which further includes checking the structured text, and removing redundant and duplicate information, so as to ensure the accuracy and integrity of the information, and ensure that the use of structural elements is consistent and conforms to logic. Additionally, the readability of the text may be enhanced by applying appropriate formats and typesetting. For example, clear fonts and font sizes are used to ensure that the text is easy to read. The appropriate indentation, alignment, identifiers, spacing, etc. may also be used to enhance the structural sense of the text.

According to the embodiments of the present disclosure, by performing structuring processing on the current text, the content of the text may be clearer and easy to understand, which greatly improves readability.

According to the embodiments of the present disclosure, structuring processing is performed on the current text based on the structural arrangement task to obtain the structurally augmented processed text, including: performing structured recognition on the current text to obtain structural recognition information for a plurality of text segments in the current text, and performing format update on the current text based on a structural format in the structural arrangement task and the structural recognition information for each of the plurality of text segments to obtain the structurally augmented processed text.

According to the embodiments of the present disclosure, the structured recognition performed on the current text includes recognition of identifiers and position of elements such as titles, subtitles, lists, and tables in the current text. The structural recognition information describes the position and role of the text segment in the text structure, such as whether it is a title, whether it belongs to a certain subtitle or list, etc.

According to the embodiments of the present disclosure, format update is performed on the current text, including: applying a target structural format to the corresponding text segment according to the structure identification information of each text segment. For example, the title is applied to a specific font and size, and the list is applied to a specific indentation and numbering style. Additionally, optimization and consistency check are performed on the format updated text. It is ensured that the formats of all text segments conform to the requirements of the target structural format, and the entire text style is consistent.

According to the embodiments of the present disclosure, through structured recognition and updating the predetermined format according to the structural format in the structural arrangement task, it may improve the efficiency of information extraction and ensure the consistency of the text structure.

Figure 6:
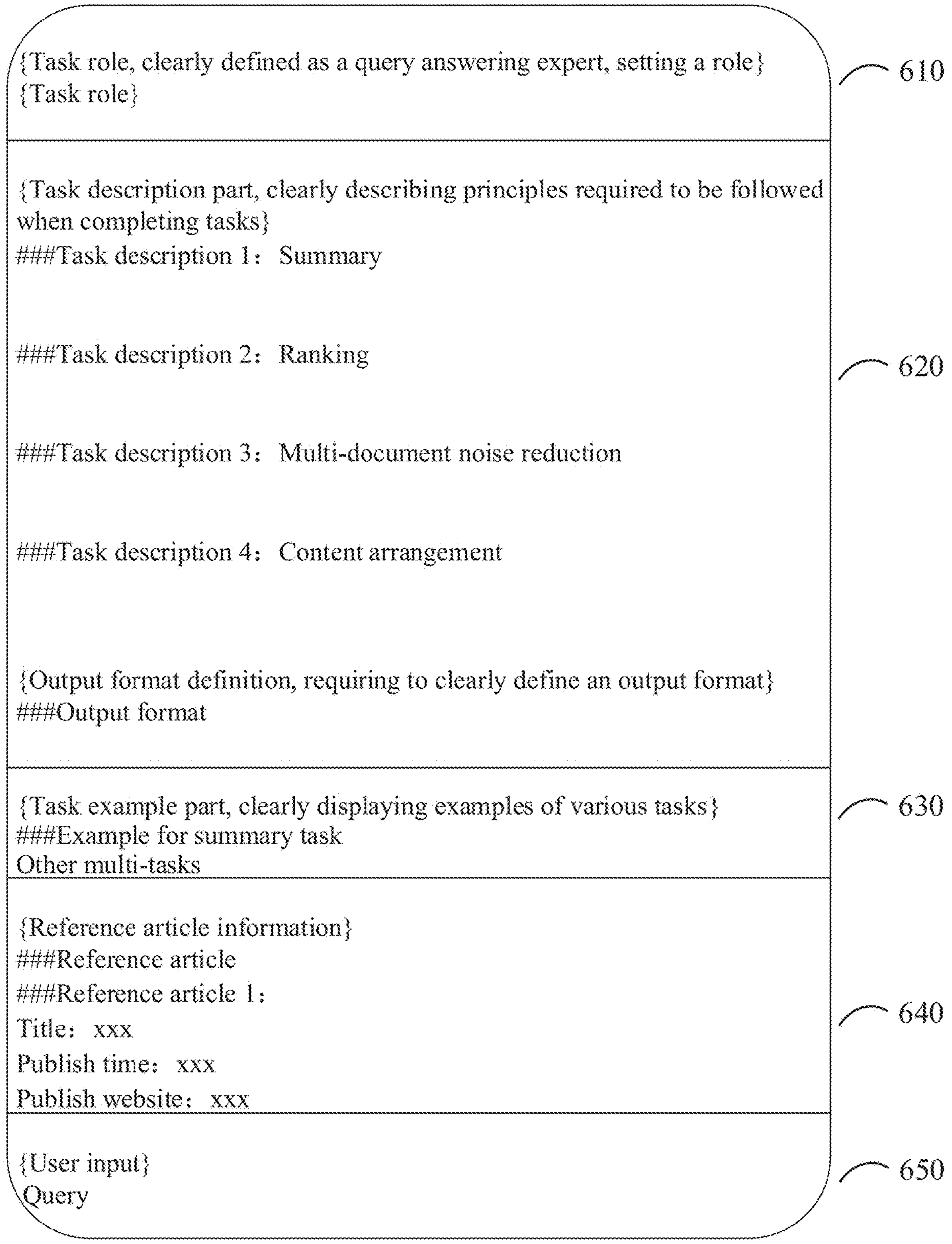
FIG. 6 schematically shows a schematic diagram of a template of prompt information for answer generation according to another embodiment of the present disclosure.

FIG. 6 schematically shows a schematic diagram of a template of prompt information for answer generation according to an embodiment of the present disclosure.

As shown in FIG. 6, the prompt information for answer generation includes several parts, such as a task role 610, a task description 620, a task example 630, a preset position for retrieval content set 640, and a preset position for query 650. The task role 610 is used to define the role of the large model as a query answering expert. The large model may process the current text retrieved according to the query filled in the preset position for query 650 by executing the tasks in the task description 620, and output the answer that meets the preset condition according to the reference example 630.

Specifically, the large model may first perform summary generation processing on the retrieval content set retrieved according to the query to obtain the summary set as the current text. The current text is ranked and filtered to obtain the ranked text. The ranked text contains a plurality of target sub-texts. Noise reduction is performed on the ranked text to obtain the noise reduced text, including a plurality of text segments. Content arrangement is performed on the plurality of text segments in the noise reduced text to obtain the content-augmented text. Finally, according to the output format requirements, structural arrangement is performed on the content-augmented text to output the final answer. It may be understood that the above sequence is illustrative, and the above tasks may be appropriately deleted or new processing tasks may be added. The present disclosure is not limited to this.

Figure 7:
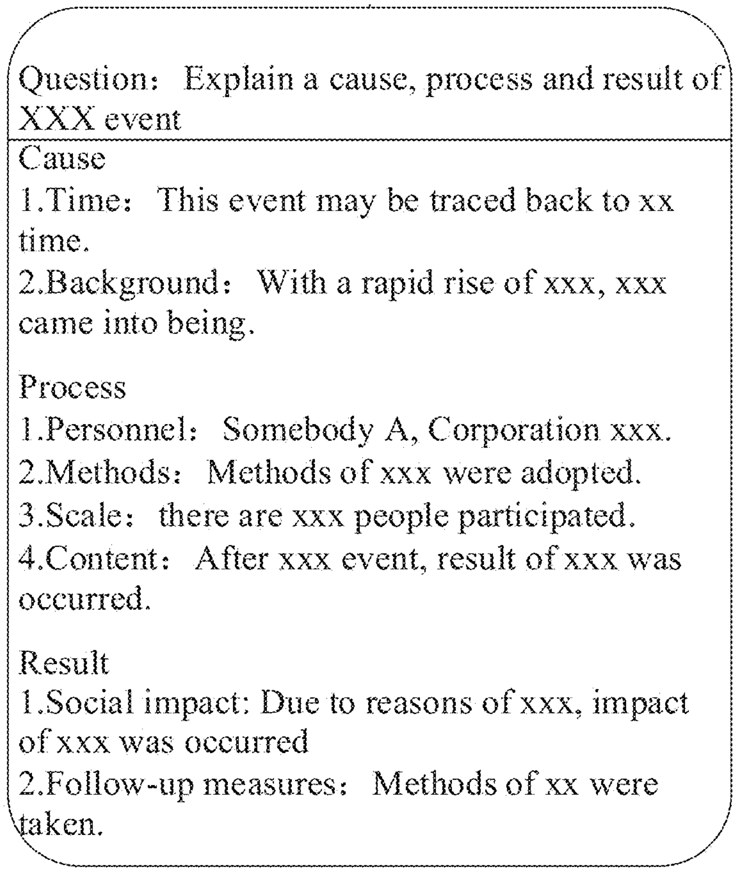
FIG. 7 schematically shows a schematic diagram of an effect of an answer according to an embodiment of the present disclosure.

FIG. 7 schematically shows a schematic diagram of an effect of a processed text according to an embodiment of the present disclosure.

As shown in FIG. 7, the processed text obtained based on the answer generation method in the present disclosure includes a title, subtitles, and related information, which has rich content, numerous information points, clear structure, and well-defined hierarchy.

According to the embodiments of the present disclosure, the processed text is evaluated based on evaluation information in the prompt information, to obtain an evaluation result configured to indicate whether the processed text meets the preset condition.

According to the embodiments of the present disclosure, the evaluation information in the prompt information for answer generation may be a set of predefined reference information, such as reference text samples, which represents text formats and content that meet specific requirements or standards. However, it is not limited to this. It may also be a set of predefined evaluation indicators, such as evaluation indicators for meeting the format of processed text, evaluation indicators for meeting content richness, evaluation indicators for meeting content depth, etc. The evaluation indicators and the reference information may be used together as the evaluation information. As long as it may be used to determine whether the processed text meets expectations and may be used as an answer to the query to be fed back to the user, the determination standard may be sufficient.

The preset condition may correspond to the evaluation information. In a case that the evaluation information includes reference information, the preset condition may include a matching degree threshold. The processed text may be matched with the reference information to determine a matching degree between the two. In a case that the matching degree is greater than the matching degree threshold, an evaluation result meeting the preset condition is obtained. In a case that the matching degree is less than or equal to the matching degree threshold, an evaluation result not meeting the preset condition is obtained.

In a case that the evaluation information includes the evaluation indicators, the preset condition may include an evaluation value. The plurality of preset evaluation indicators may be used to evaluate the processed text to obtain sub-evaluation values corresponding to the plurality of evaluation indicators. By weighting and summing the plurality of sub-evaluation values, the evaluation value is obtained. In a case that the evaluation value is greater than the evaluation value threshold, an evaluation result meeting the preset condition is obtained. In a case that the evaluation value is less than or equal to the evaluation value threshold, an evaluation result not meeting the preset condition is obtained.

The processed text that meets both the evaluation value threshold and the matching degree threshold may be output as the answer. In a case that one of these thresholds is not met, the content arrangement task and the structural arrangement task may be executed repeatedly based on the query, the prompt information for answer generation, and the retrieval content set, so as to obtain an expected answer.

According to the embodiments of the present disclosure, by using evaluation information as a benchmark for evaluation, it may be ensured that the large model generates processed text that meets the preset condition, thereby providing controllable guidance on the output results through evaluation information.

Alternatively, the evaluation indicators in the evaluation information may be set in each task to be executed, so as to evaluate a completion status of each task after execution and determine whether it meets the preset condition. If the preset condition is not met, the task may be repeatedly executed. The reference information in the evaluation information is set as the last task to be executed, which is used to evaluate the processed text using the final reference information, so as to ensure the integrity and uniformity of the final output answer.

According to the embodiments of the present disclosure, in the process of executing the query answering method based on a large model, the large model may execute the plurality of tasks in a controllable order when processing the plurality of tasks by adding order identifiers to indicate the order in which the tasks are executed. Furthermore, the evaluation information is added in the prompt information for answer generation, so that the large model may correctly evaluate the results after executing the tasks, thereby avoiding generating hallucinatory answers.

According to the embodiments of the present disclosure, there is provided an intelligent agent configured to implement the query answering method based on a large model as shown in FIG. 2.

The intelligent agent is an advanced artificial intelligence system that utilizes a large model as its core reasoning engine. It not only possesses the language understanding and generation capabilities of a large model but also efficiently and flexibly solves various complex problems, further unlocking the machine intelligence inherent in large language models, thereby providing users with more precise and personalized services.

Figure 8:
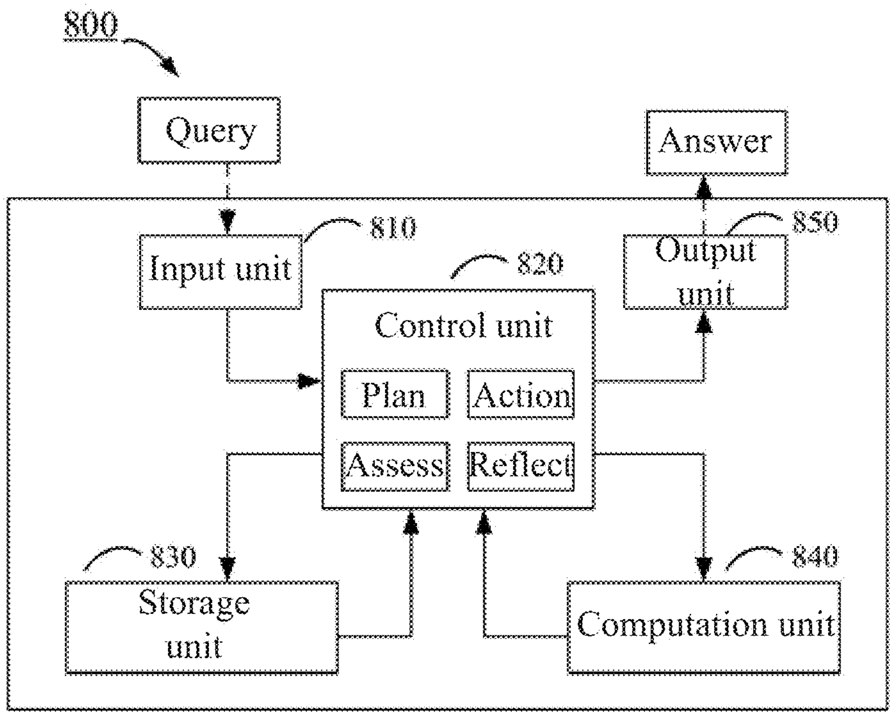
FIG. 8 schematically shows a schematic diagram of an intelligent agent according to an embodiment of the present disclosure.

FIG. 8 schematically shows a schematic diagram of an intelligent agent according to an embodiment of the present disclosure.

As shown in FIG. 8, the intelligent agent 800 may include: an input unit 810, a control unit 820, a storage unit 830, a computation unit 840 and an output unit 850.

The input unit 810 may be used to receive or perceive an inquiry, a request, an instruction, a query, a signal, or data from the outside world, such as users or external environments, and convert them into format information that may be understood and processed by the intelligent agent. The input unit 810 is a primary link for the intelligent agent 800 to interact with the outside world. The input unit 810 enables the intelligent agent 800 to efficiently and accurately acquire needed "sensory" information from the outside world and respond to this information.

In the example, the input unit 810 may perform an operation of acquiring a query involved in the method shown in FIG. 2.

The control unit 820 is a core support for the ability of the intelligent agent 800 to process complex tasks. The control capabilities of the control unit 820 may include four aspects: planning capability, action capability, evaluation capability, and reflection capability. In the example, the control unit may use its planning capability to determine the current task to be executed. The action capability may be used to perform operations S220 and S230 as shown in FIG. 2 to process the current text, so as to obtain the processed text. The evaluation capability is used to evaluate the processed document based on the evaluation information, so as to determine whether the processed text may serve as the answer to the query. The reflection capability may be used to re-execute operations S220 and S230 in a case of determining that the processed text does not meet the preset condition. In the example, the control unit 820 will continuously interact with the storage unit 830, the computation unit 840 and/or the output unit 850. However, it should be noted that in the embodiments of the present disclosure, the control unit 820 initiates communication with the storage unit 830, the computation unit 840 and/or the output unit 850 as a single initiator, while there is no communication coupling among the storage unit 830, the computation unit 840 and the output unit 850.

In the example, the performance of the control unit 820 may be closely related to the large model on which the intelligent agent 800 is based. In order to fully leverage the capabilities of the large model, the internal structure of the control unit 820 may be designed to be highly configurable and extensible, so as to accommodate various types of tasks and requirements in real scenarios.

The storage unit 830 may be responsible for memorizing information such as historical dialogues and event streams. The memorized information may be stored in the storage unit 830.

In the example, after acquiring input information such as a query, the intelligent agent 800 may determine whether a retrieval operation needs to be triggered. In a case of determining that the retrieval operation does not need to be triggered, the intelligent agent 800 may retrieve an answer corresponding to the query from the storage unit 830, and provide the answer to the control unit 820. The control unit 820 may utilize the fed-back answer and transmit the answer to the output unit 850.

The computation unit 840 may be regarded as a predefined tool library. The aforementioned plug-in tools, function tools, interface tools, and model tools may be included in the computation unit 840.

In the example, in a case that the intelligent agent 800 determines that the execution information includes tool information, relevant tool information may be called from the computation unit 840 and fed back to the control unit 820. The control unit 820 may retrieve the plurality of rephrasing queries using the fed-back tool information such as a search engine to obtain a retrieval content set, and perform the operations as shown in FIG. 2 based on the retrieval content set, the query and the prompt information for answer generation acquired from the storage unit 830 to obtain the answer. The answer is transmitted to the computation unit 840, so that the computation unit may execute the output unit 850. It may be understood that although the large model has excellent language understanding and generation capabilities, like humans, it may only solve a limited number of tasks without the help of any tools. When the intelligent agent 800 is endowed with the capability to call tools, it may complete tasks such as mathematical computations with the help of a calculator, data analysis with the help of data analysis software, and weather forecasts with the help of a search engine.

The intelligent agent 800 according to the embodiments of the present disclosure may simply and effectively enhance the degree of intelligence, and improve flexibility and versatility.

Figure 9:
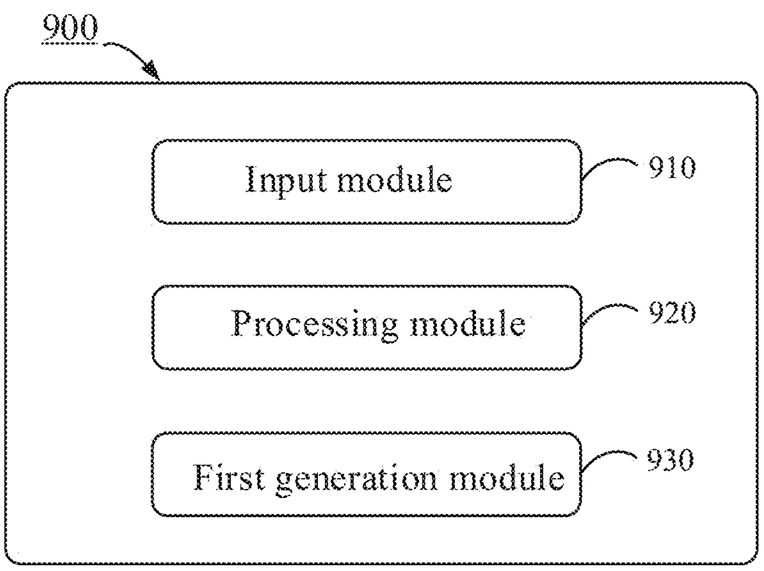
FIG. 9 schematically shows a block diagram of a query answering apparatus based on a large model according to an embodiment of the present disclosure.

FIG. 9 schematically shows a block diagram of a query answering apparatus according to an embodiment of the present disclosure.

As shown in FIG. 9, the query answering device 900 includes an input module 910, an input module 920, and a processing module 930.

The input module 910 is used to input, in response to a retrieval content set retrieved based on a query, the query, the retrieval content set and prompt information for answer generation into a large model.

The processing module 920 is configured to process, based on a current task to be executed in the prompt information for answer generation and the query, a current text corresponding to the retrieval content set to obtain a processed text. The current task to be executed is determined based on a task execution order in the prompt information for answer generation.

The first generation module 930 is used to obtain, in a case of determining that the processed text meets a preset condition, an answer to the query based on the processed text.

According to the embodiments of the present disclosure, the processing module includes a content processing sub-module.

The content processing sub-module is used to perform, based on the content arrangement task, content processing on the current text to obtain a content-augmented processed text.

According to the embodiments of the present disclosure, the content processing sub-module includes a content filtering unit.

The content filtering unit is used to determine, based on a content matching degree of each of a plurality of text segments in the current text and an attribute matching degree of each of the plurality of text segments in the current text, a predetermined number of target text segments from the current text as the content-augmented processed text. The content matching degree is determined based on a similarity between the text segment and the query, the attribute matching degree is determined based on traceability information of the text segment, the traceability information of the text segment is determined based on the retrieval content set, and the predetermined number is determined based on the content filtering task.

According to the embodiments of the present disclosure, the content processing sub-module further includes a noise reduction unit and an extraction unit.

The noise reduction unit is used to perform noise reduction on the current text based on the content extraction task to obtain a noise reduced text.

The extraction unit is used to perform content extraction on the noise reduced text to obtain a plurality of hierarchically augmented text segments as the content-augmented processed text.

According to the embodiments of the present disclosure, the extraction unit includes a text segment processing sub-unit and a first sentence processing sub-unit.

The text segment processing sub-unit is used to rearrange the plurality of text segments based on contextual relationships among the plurality of text segments in the noise reduced text, and generate identification information used to identify respective contextual relationships of the plurality of text segments, so as to obtain a processed text with paragraph-level hierarchical augmentation.

The first sentence processing sub-unit is used to rearrange the plurality of sentences based on contextual relationships among the plurality of sentences, and generate identification information used to identify respective contextual relationships of the plurality of sentences, so as to obtain a hierarchically augmented processed text. The plurality of sentences are obtained by splitting the text segments in the processed text with paragraph-level hierarchical augmentation.

According to the embodiments of the present disclosure, the extraction unit further includes a second sentence processing sub-unit.

The second sentence processing sub-unit is used to rearrange the plurality of sentences based on the contextual relationships among a plurality of sentences obtained by splitting the noise reduced text, and generate identification information used to identify respective contextual relationships of the plurality of sentences, so as to obtain the hierarchically augmented processed text.

According to the embodiments of the present disclosure, the query answering apparatus 900 further includes a summary processing module.

The summary processing module is used to perform summary generation processing on the retrieval content set based on a summary generation task in the prompt information for answer generation to obtain a summary set as the current text.

According to the embodiments of the present disclosure, the processing module 920 further includes a structuring processing sub-module.

The structuring processing sub-module is used to perform structuring processing on the current text based on the structural arrangement task to obtain a structurally augmented processed text.

According to the embodiments of the present disclosure, the structuring processing sub-module includes a structured recognition unit and a structure update unit.

The structured recognition unit is used to perform structured recognition on the current text to obtain structural recognition information for a plurality of text segments in the current text.

The structure updating unit is used to perform format update on the current text based on a structural format in the structural arrangement task and the structural recognition information for the plurality of text segments, to obtain the structurally augmented processed text.

According to the embodiments of the present disclosure, the query answering apparatus 900 further includes an evaluation module.

The evaluation module is used to evaluate the processed text to obtain an evaluation result used to indicate whether the processed text meets the preset condition based on evaluation information in the prompt information for answer generation.

According to the embodiments of the present disclosure, the evaluation information may include at least one of: an evaluation indicator and reference information.

According to the embodiments of the present disclosure, the input module 910 further includes a first input sub-module.

The first input sub-module is used to fill the query and the retrieval content set into preset positions in the prompt information for answer generation respectively, and input the prompt information for answer generation into the large model. The prompt information includes a plurality of tasks added with order identifiers used to indicate an order in which tasks are executed.

According to the embodiments of the present disclosure, the query answering apparatus further includes an analysis module and a query rephrasing module.

The analysis module is used to perform retrieval trigger analysis on the query to obtain a retrieval trigger analysis result based on a retrieval trigger recognition task in the prompt information for query analysis.

The query rephrasing module is used to rephrase, in a case that the retrieval trigger analysis result represents that a retrieval operation needs to be triggered, the query to obtain a plurality of rephrased queries based on a query rephrasing task in the prompt information for query analysis, so as to obtain the retrieval content set based on the plurality of rephrased queries.

According to the embodiments of the present disclosure, the query answering apparatus 900 further includes a second generation module.

The second generation module is used to generate, in a case that the retrieval trigger analysis result represents that the retrieval operation does not need to be triggered, the answer to the query based on the query.

According to the embodiments of the present disclosure, the query rephrasing module includes a query rephrasing sub-module.

The query rephrasing sub-module is used to rephrase the query to obtain the plurality of rephrased queries based on a rephrasing rule that matches with a query type of the query in the query rephrasing task.

According to the embodiments of the present disclosure, the query rephrasing module further includes a first rephrasing unit and a second rephrasing unit.

The first rephrasing unit is used to rephrase the query based on the query rephrasing task to obtain a plurality of initial rephrased queries.

The second rephrasing unit is used to obtain, in a case that a correlation between each of the plurality of initial rephrased queries and the query meets a correlation threshold in the query rephrasing task, the plurality of rephrased queries based on the plurality of initial rephrased queries.

According to the embodiments of the present disclosure, the input module further includes a second input sub-module.

The second input sub-module is used to fill the query into a preset position in the prompt information for query analysis, and input the prompt information for query analysis into the large model, wherein the retrieval trigger recognition task and the query rephrasing task in the prompt information for query analysis are respectively added with an order identifier configured to indicate an order in which the tasks are executed.

According to the embodiments of the present disclosure, the present disclosure further provides an electronic device, a readable storage medium and a computer program product.

According to the embodiments of the present disclosure, there is provided an electronic device, including: at least one processor; and a memory communicatively coupled with the at least one processor; where the memory stores instructions executable by the at least one processor, and the instructions, when executed by the at least one processor, cause the at least one processor to implement the aforementioned method.

According to the embodiments of the present disclosure, there is provided a non-transitory computer readable storage medium storing computer instructions, where the computer instructions are configured to cause a computer to implement the aforementioned method.

According to the embodiments of the present disclosure, there is provided a computer program product including a computer program, where the computer program, when executed by a processor, implements the aforementioned method.

Figure 10:
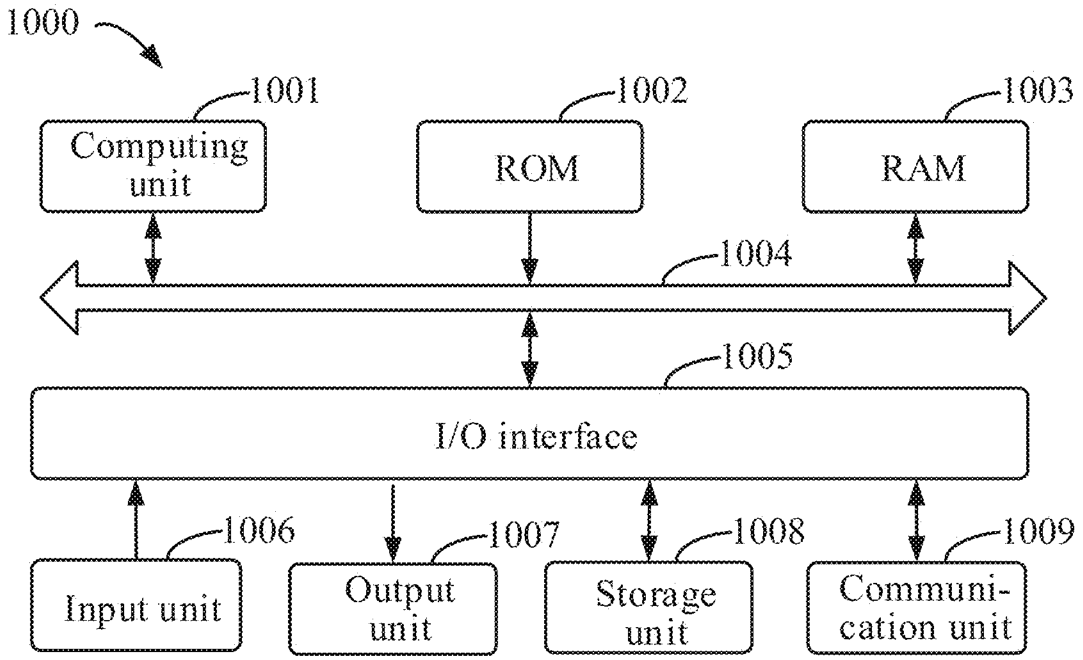
FIG. 10 schematically shows a block diagram of an electronic device according to an embodiment of the present disclosure.

FIG. 10 schematically shows a schematic block diagram of an example electronic device 1000 that may be used to implement the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 may include computing unit 1001, which may perform various appropriate actions and processing based on a computer program stored in a read-only memory (ROM) 1002 or a computer program loaded from a storage unit 1008 into a random access memory (RAM) 1003. Various programs and data required for the operation of the electronic device 1000 may be stored in the RAM 1003. The computing unit 1001, the ROM 1002 and the RAM 1003 are connected to each other through a bus 1004. An input/output (I/O) interface 1005 is further connected to the bus 1004.

Various components in the electronic device 1000 are connected with I/O interface 1005, including an input unit 1006, such as a keyboard, a mouse, etc.; an output unit 1007, such as various types of displays, speakers, etc.; a storage unit 1008, such as a magnetic disk, an optical disk, etc.; and a communication unit 1009, such as a network card, a modem, a wireless communication transceiver, etc. The communication unit 1009 allows the electronic device 1000 to exchange information/data with other devices through a computer network such as the Internet and/or various telecommunication networks.

The computing unit 1001 may be various general-purpose and/or special-purpose processing components with processing and computing capabilities. Some examples of the computing unit 1001 include but are not limited to a central processing unit (CPU), a graphics processing unit (GPU), various dedicated artificial intelligence (AI) computing chips, various computing units running machine learning model algorithms, a digital signal processor (DSP), and any appropriate processor, controller, microcontroller, and so on. The computing unit 1001 may perform the various methods and processes described above, such as the query answering method. For example, in some embodiments, the query answering method may be implemented as a computer software program that is tangibly contained on a machine-readable medium, such as a storage unit 1008. In some embodiments, part or all of a computer program may be loaded and/or installed on the electronic device 1000 via the ROM 1002 and/or the communication unit 1009. When the computer program is loaded into the RAM 1003 and executed by the computing unit 1001, one or more steps of the query answering method described above may be performed. Alternatively, in other embodiments, the computing unit 1001 may be configured to perform the query answering method in any other appropriate way (for example, by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

Program codes for implementing the method of the present disclosure may be written in any combination of one or more programming languages. These program codes may be provided to a processor or a controller of a general-purpose computer, a special-purpose computer, or other programmable data processing devices, so that when the program codes are executed by the processor or the controller, the functions/operations specified in the flowchart and/or block diagram may be implemented. The program codes may be executed completely on the machine, partly on the machine, partly on the machine and partly on the remote machine as an independent software package, or completely on the remote machine or the server.

In the context of the present disclosure, the machine readable medium may be a tangible medium that may contain or store programs for use by or in combination with an instruction execution system, device or apparatus. The machine readable medium may be a machine-readable signal medium or a machine-readable storage medium. The machine readable medium may include, but not be limited to, electronic, magnetic, optical, electromagnetic, infrared or semiconductor systems, devices or apparatuses, or any suitable combination of the above. More specific examples of the machine readable storage medium may include electrical connections based on one or more wires, portable computer disks, hard disks, random access memory (RAM), read-only memory (ROM), erasable programmable read-only memory (EPROM or flash memory), optical fiber, convenient compact disk read-only memory (CD-ROM), optical storage device, magnetic storage device, or any suitable combination of the above.

In order to provide interaction with users, the systems and techniques described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server. The server may also be a server of a distributed system or a server combined with a blockchain.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A query answering method based on a large model, comprising:
   inputting, in response to a query received, the query and prompt information for query analysis into the large model, so that the large model performs operations of:
      performing, based on a retrieval trigger recognition task in the prompt information for query analysis, retrieval trigger analysis on the query to obtain a retrieval trigger analysis result; and
      rephrasing, in a case that the retrieval trigger analysis result represents that a retrieval operation needs to be triggered, the query to obtain a plurality of rephrased queries based on a query rephrasing task in the prompt information for query analysis, so as to obtain a retrieval content set based on the plurality of rephrased queries;
   inputting, in response to the retrieval content set retrieved based on the query, the query, the retrieval content set and prompt information for answer generation into the large model, so that the large model performs operations of:
      processing, based on a current task to be executed in the prompt information for answer generation and the query, a current text corresponding to the retrieval content set to obtain a processed text, wherein the current task to be executed is determined based on order identifiers configured to indicate an execution order of a plurality of tasks in the prompt information for answer generation; and
      obtaining, in a case of determining that the processed text meets a preset condition, an answer to the query based on the processed text, wherein the answer is presented on a terminal device in a structural format that includes one or more titles, subtitles, and lists, wherein the plurality of tasks comprises at least a content arrangement task and a structural arrangement task;
   processing, based on the current task to be executed, the current text corresponding to the retrieval content set to obtain the processed text, comprises:
      performing structured recognition on the current text to obtain structural recognition information for a plurality of text segments in the current text; and
      performing, based on a structural format in the structural arrangement task and the structural recognition information for the plurality of text segments, format update on the current text to obtain the structurally augmented processed text.

2. The method of claim 1, wherein the current task to be executed comprises the content arrangement task; and
   processing, based on the current task to be executed for answer generation in the prompt information for answer generation, the current text corresponding to the retrieval content set to obtain the processed text, comprises:
   performing, based on the content arrangement task, content processing on the current text to obtain a content-augmented processed text.

3. The method of claim 2, wherein the content arrangement task comprises a content filtering task; and
   performing, based on the content arrangement task, content processing on the current text corresponding to the retrieval content set to obtain the content-augmented processed text, comprises:
   determining, based on a content matching degree of each of a plurality of sub-texts in the current text and an attribute matching degree of each of the plurality of sub-texts in the current text, a predetermined number of target sub-texts from the current text as the content-augmented processed text, wherein the content matching degree is determined based on a similarity between the sub-text and the query, the attribute matching degree is determined based on traceability information of the sub-text, the traceability information of the sub-text is determined based on the retrieval content set, and the predetermined number is determined based on the content filtering task.

4. The method of claim 2, wherein the content arrangement task comprises a content extraction task; and performing, based on the content arrangement task, content processing on the current text to obtain the content-augmented processed text, comprises:

performing, based on the content extraction task, noise reduction on the current text to obtain a noise reduced text; and performing content extraction on the noise reduced text to obtain a plurality of hierarchically augmented text segments as the content-augmented processed text.

5. The method of claim 4, wherein performing content extraction on the noise reduced text to obtain the plurality of hierarchically augmented text segments as the content-augmented processed text, comprises:

rearranging, based on contextual relationships among a plurality of text segments in the noise reduced text, the plurality of text segments, and generating identification information configured to identify respective contextual relationships of the plurality of text segments, so as to obtain a processed text with paragraph-level hierarchical augmentation; and rearranging a plurality of sentences based on contextual relationships among the plurality of sentences, and generating identification information configured to identify respective contextual relationships of the plurality of sentences, so as to obtain a hierarchically augmented processed text, wherein the plurality of sentences are obtained by splitting text segments in the processed text with paragraph-level hierarchical augmentation.

6. The method of claim 4, wherein performing content extraction on the noise reduced text to obtain the plurality of hierarchically augmented text segments as the content-augmented processed text, comprises:

rearranging, based on contextual relationships among a plurality of sentences obtained by splitting the noise reduced text, the plurality of sentences, and generating identification information configured to identify respective contextual relationships of the plurality of sentences, so as to obtain the hierarchically augmented processed text.

7. The method of claim 1, further comprising:

performing, based on a summary generation task in the prompt information for answer generation, summary generation processing on the retrieval content set to obtain a summary set as the current text.

8. The method of claim 1, further comprising:

evaluating, based on evaluation information in the prompt information for answer generation, the processed text to obtain an evaluation result configured to indicate whether the processed text meets the preset condition.

9. The method of claim 8, wherein the evaluation information comprises at least one of an evaluation indicator and reference information.

10. The method of claim 1, wherein inputting the query, the retrieval content set and the prompt information for answer generation into the large model comprises:

filling the query and the retrieval content set into preset positions in the prompt information for answer generation respectively, and inputting the prompt information for answer generation into the large model, wherein the prompt information comprises a plurality of tasks added with order identifiers configured to indicate an order in which tasks are executed.

11. The method of claim 1, further comprising:

generating, in a case that the retrieval trigger analysis result represents that the retrieval operation does not need to be triggered, the answer to the query based on the query.

12. The method of claim 1, wherein rephrasing the query to obtain the plurality of rephrased queries based on the query rephrasing task in the prompt information for query analysis, comprises:

rephrasing, based on a rephrasing rule that matches with a query type of the query in the query rephrasing task, the query to obtain the plurality of rephrased queries.

13. The method of claim 1, wherein rephrasing the query to obtain the plurality of rephrased queries based on the query rephrasing task in the prompt information for query analysis, comprises:

rephrasing, based on the query rephrasing task, the query to obtain a plurality of initial rephrased queries; and obtaining, in a case that a correlation between each of the plurality of initial rephrased queries and the query meets a correlation threshold in the query rephrasing task, the plurality of rephrased queries based on the plurality of initial rephrased queries.

14. The method of claim 1, wherein inputting the query and the prompt information for query analysis into the large model, comprises:

filling the query into a preset position in the prompt information for query analysis, and inputting the prompt information for query analysis into the large model, wherein the retrieval trigger recognition task and the query rephrasing task in the prompt information for query analysis are respectively added with an order identifier configured to indicate an order in which tasks are executed.

15. An electronic device, comprising:

at least one processor; and a memory communicatively coupled with the at least one processor, wherein the memory stores instructions executable by the at least one processor, and the instructions, when executed by the at least one processor, cause the at least one processor to implement a method comprising:

inputting, in response to a query received, the query and prompt information for query analysis into the large model, so that the large model performs operations of:

performing, based on a retrieval trigger recognition task in the prompt information for query analysis, retrieval trigger analysis on the query to obtain a retrieval trigger analysis result; and rephrasing, in a case that the retrieval trigger analysis result represents that a retrieval operation needs to be triggered, the query to obtain a plurality of rephrased queries based on a query rephrasing task in the prompt information for query analysis, so as to obtain a retrieval content set based on the plurality of rephrased queries;

inputting, in response to the retrieval content set retrieved based on the query, the query, the retrieval content set and prompt information for answer generation into the large model, so that the large model performs operations of:

processing, based on a current task to be executed in the prompt information for answer generation and the query, a current text corresponding to the retrieval content set to obtain a processed text, wherein the current task to be executed is determined based on order identifiers configured to indicate an execution order of a plurality of tasks in the prompt information for answer generation; and obtaining, in a case of determining that the processed text meets a preset condition, an answer to the query based on the processed text, wherein the answer is presented on a terminal device in a structural format that includes one or more titles, subtitles, and lists, wherein the plurality of tasks comprises at least a content arrangement task and a structural arrangement task; and processing, based on the current task to be executed, the current text corresponding to the retrieval content set to obtain the processed text, comprises:

performing structured recognition on the current text to obtain structural recognition information for a plurality of text segments in the current text; and performing, based on a structural format in the structural arrangement task and the structural recognition information for the plurality of text segments, format update on the current text to obtain the structurally augmented processed text.

16. A non-transitory computer readable storage medium storing computer instructions, wherein the computer instructions are configured to cause the computer to implement a method comprising:

inputting, in response to a query received, the query and prompt information for query analysis into the large model, so that the large model performs operations of:

performing, based on a retrieval trigger recognition task in the prompt information for query analysis, retrieval trigger analysis on the query to obtain a retrieval trigger analysis result; and rephrasing, in a case that the retrieval trigger analysis result represents that a retrieval operation needs to be triggered, the query to obtain a plurality of rephrased queries based on a query rephrasing task in the prompt information for query analysis, so as to obtain a retrieval content set based on the plurality of rephrased queries;

inputting, in response to the retrieval content set retrieved based on the query, the query, the retrieval content set and prompt information for answer generation into the large model, so that the large model performs operations of:

processing, based on a current task to be executed in the prompt information for answer generation and the query, a current text corresponding to the retrieval content set to obtain a processed text, wherein the current task to be executed is determined based on order identifiers configured to indicate an execution order of a plurality of tasks in the prompt information for answer generation; and obtaining, in a case of determining that the processed text meets a preset condition, an answer to the query based on the processed text, wherein the answer is presented on a terminal device in a structural format that includes one or more titles, subtitles, and lists, wherein the plurality of tasks comprises at least a content arrangement task and a structural arrangement task; and processing, based on the current task to be executed, the current text corresponding to the retrieval content set to obtain the processed text, comprises:

performing structured recognition on the current text to obtain structural recognition information for a plurality of text segments in the current text; and performing, based on a structural format in the structural arrangement task and the structural recognition information for the plurality of text segments, format update on the current text to obtain the structurally augmented processed text.

* * * * *